June 12, 1962  A. C. BLUMENFELD ETAL  3,039,063
SWEEP AND FLYBACK CIRCUIT
Filed Dec. 22, 1960

INVENTOR.
ARTHUR C. BLUMENFELD
JOHN W. GRAY
BY
ATTORNEY.

United States Patent Office 3,039,063
Patented June 12, 1962

3,039,063
SWEEP AND FLYBACK CIRCUIT
Arthur C. Blumenfeld, Brewster, and John W. Gray, Pleasantville, N.Y., assignors to General Precision, Inc., a corporation of Delaware
Filed Dec. 22, 1960, Ser. No. 77,570
7 Claims. (Cl. 331—4)

This invention relates to electronic circuits for cyclically varying the frequency of an oscillator and particularly to such circuits applied to Doppler navigation systems.

Doppler radar navigation systems for aircraft generally employ a frequency-tracking circuit to which received signals at the Doppler frequency are applied. This circuit locks to the center frequency of the Doppler frequency spectrum and remains locked, tracking the frequency, during normal Doppler frequency changes.

Such a circuit is described in U.S. Patent No. 2,915,748 and is more generally described in an article entitled The AN/APN–81 Doppler Navigation System, published in Transactions ANE–4, of the Institute of Radio Engineers, December 1957, pp. 202–211.

A frequency tracker consists of components in a closed loop including an integrator and an oscillator. The loop receives the Doppler spectrum signal and the oscillator, under control of the integrator, generates a signal having a frequency representative of the center of the Doppler frequency spectrum.

When the Doppler signal input becomes weak or fails for any reason, facilities are provided to convert the frequency tracker from its normal mode to its memory mode of operation, in which it "remembers" the frequency of the last Doppler signal received and continues to emit a voltage analog of that frequency. When the frequency tracker is initially put into operation it starts in the memory mode, and changes to the normal mode upon acquisition of a signal. During memory mode operation the frequency tracker continually searches for a signal by the continuous and repeated sweeping of its oscillator from end to end of its frequency range. When a signal is found the sweeping is stopped, the signal is acquired by the frequency tracker, which locks to it, and the mode of operation is said to have changed from memory to normal mode.

The sweeping operation is effected by the operation of an auxiliary circuit, the circuit of this invention, here termed the sweep and flyback circuit. The operation of this circuit causes the frequency tracker oscillator to change its frequency, slowly, from one end to the other of its entire range, then causes the oscillator frequency to fly back rapidly to the starting end of its range. Thus, as the frequency tracker sweeps slowly over its range, any Doppler input signal of sufficient strength applied at the input of the frequency tracker will be found, acquired and tracked.

The sweep and flyback circuit includes a frequency meter circuit which has an alternating input and emits a direct current or potential proportional to the alternating frequency. In the operation of this circuit to control tracker sweeping in the memory mode, the changing output of the tracker oscillator is applied to the frequency meter circuit. The output potential thereof operates a relay when the frequency of the oscillator has attained a selected value at one end of its range. The relay changes connections in the frequency meter and also in the frequency tracker integrator in such manner as to reverse the direction of change of the oscillator output frequency. At the opposite end of the frequency range the frequency meter output releases the relay, again reversing the direction of change of the oscillator output frequency. Upon acquisition of a signal the sweep and flyback circuit is disabled.

The purpose of this invention is to provide a circuit for periodically increasing and decreasing the frequency of an oscillator.

A further understanding of this invention may be secured from the detailed description and the drawings, in which.

Figure 1:
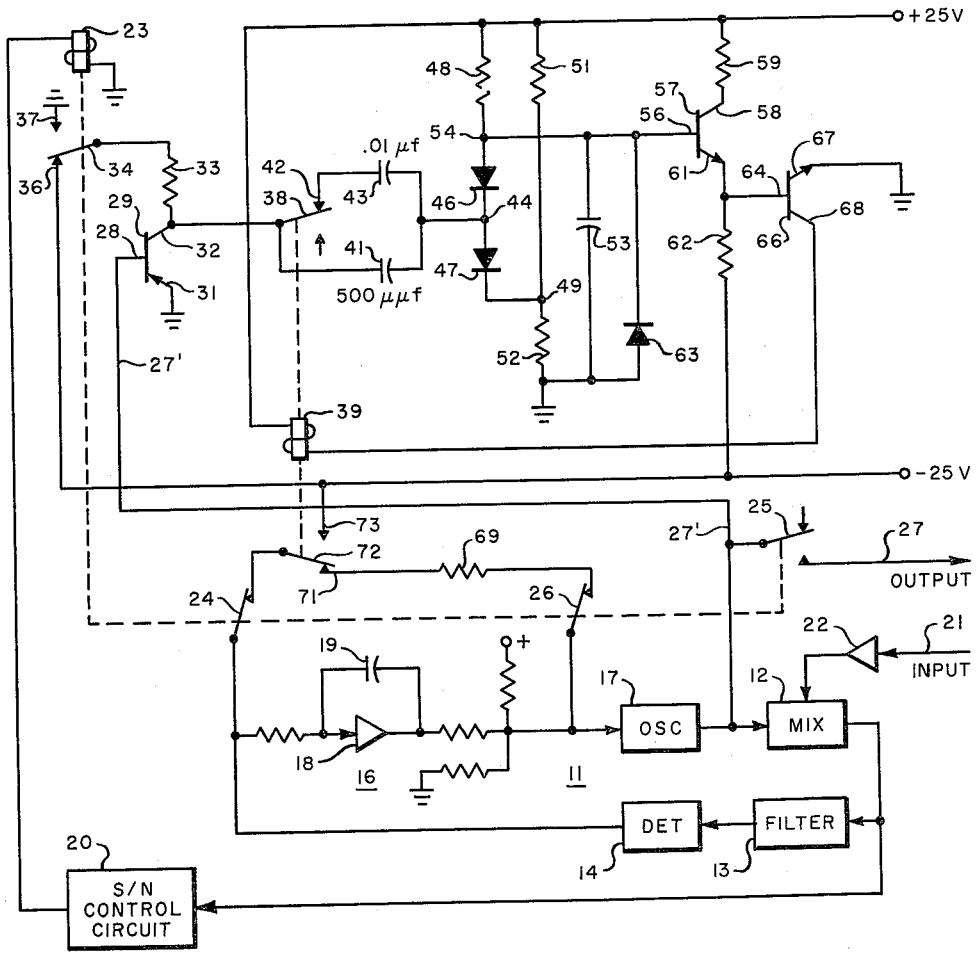
FIGURE 1 is a schematic diagram of the circuit of an embodiment of the invention.

Referring now to FIGURE 1, a representative resonant frequency tracker loop 11 is shown. It consists principally of a mixer 12, resonant filter 13, amplitude detector 14, integrator 16, and oscillator 17. The integrator 16 consists of a high gain inverting amplifier 18 shunted by a capacitor 19, and associated resistors. The Doppler signal having a center frequency lying in the spectrum range between 1.3 kc.p.s. and 27 kc.p.s. is applied at conductor 21. It is amplified in an amplifier 22 containing an automatic gain control circuit and the amplified output is applied to the mixer 12.

In normal operation of this frequency tracker with an input signal having a sufficiently high signal-to-noise ratio (S/N), the relay 23 is operated from the output of mixer 12 through a control circuit 20, opening contacts 24, 26 and 36 and closing contacts 25 and 37. Assuming that the signal has been acquired, the oscillator 17 output frequency is such that, when beat with the input signal in mixer 12, the difference sideband is within the transmission band of the filter 13. By means of a dual signal input, dual filter transmission band or other dual element, any lack of exact correspondence of the signal spectrum with the filter transmission band appears as an error signal which, after detection at 14, is applied to the integrator 16. This input, if different from zero, causes the integrator output to increase or decrease. This output is applied to the oscillator 17 and causes its frequency to undergo a corresponding increase or decrease, the direction being such as to reduce the error signal. Output is taken from oscillator 17 through contacts 25 and conductor 27 in the form of an electrical signal having a frequency representative of the tracked Doppler spectrum center frequency. This signal may be passed through a servo or slaved oscillator so arranged as to maintain its constant frequency output when the circuit is changed from the normal to the search mode of operation.

The output of oscillator 17 is also applied through conductor 27' to the base 28 of a transistor 29 having its emitter 31 grounded and its collector 32 connected through a resistor 33 to a contact arm 34 of relay 23. The back or normal contact 36 is connected to −25 volts potential and the front or operated contact 37 is grounded. The collector 32 is also connected to a contact arm 38 of a relay 39 and to one plate of a small capacitor 41. The contact 42 is connected to one plate of a larger capacitor 43. The other capacitor plates are connected together and to a terminal 44 joining two diodes 46 and 47. Diode 46 is connected through a resistor 48 to a +25 volt potential source and diode 47 is connected to an intermediate point 49 of a potential divider consisting of resistors 51 and 52. This divider is connected between the +25 volt source and ground. The unloaded potential of the point 49 is about 2 volts. A smoothing capacitor 53 is connected to the junction 54 between the resistor 48 and diode 46. The other end of the capacitor is grounded. The base 56 of a transistor 57 is connected to the junction 54. The collector 58 is connected through a resistor 59 to the source of positive potential and the emitter 61 is connected through a resistor 62 to the source of negative potential. The transistor 57 is protected by a diode 63 connected between the base 56 and ground. The base 64 of a transistor 66 is connected to emitter 61. The emitter 67 is grounded. The collector 68 is connected to the coil of relay 39, the other end of which is connected to the source of positive potential.

In the search mode the two relay contacts 24 and 26 are closed, and interconnect the input and output of integrator 16 through a resistor 69. The normal contact 71 of relay 39 and the contact arm 72 are connected between contacts 24 and resistor 69. The operated or normally-open fixed contact 73 is connected to the source of negative potential.

In the normal mode of operation the S/N relay 23 is operated and the collector 32 is thereby grounded. This renders the sweep and flyback circuit inoperative.

Operation in the search mode is as follows. Let it be assumed that the frequency of oscillator 17 has attained its maximum of, for example, 27 kc.p.s., and is slowly decreasing, thus causing the system to sweep the spectrum. The relay 23 is unoperated and therefore negative potential is applied through its back contact 36 to the collector 32 of transistor 29, causing the sweep and flyback circuit to be operative. The relay 39 is normal, so that its contacts 38/42 are closed, placing capacitors 41 and 43 in parallel. The relay contacts 71/72 are closed, placing the resistor 69 connecting the input and output of the integrator 16.

In sweeping a Doppler spectrum range, it is desirable to pass through a signal spectrum at some optimum rate slow enough to facilitate pickup but fast enough to screen out unwanted signals to some extent. However, as the signal spectrum width is directly proportional to frequency, this requires the sweep rate to decrease in direct proportion to the frequency decrease. This kind of change is termed exponential, and is exactly the sort of change of the voltage of the capacitor 19 which occurs when the integrator 16 is short circuited. By selection of the resistance of resistor 69 the rate of sweep is set to its optimum value.

As an indication of a satisfactory sweep rate, in FIGURE 1, the total time of sweep from 27 kc.p.s. to 1.3 kc.p.s. is 100 seconds.

The output terminal voltages of the integrator 16 corresponding to the beginning and end of the discharge are $+10$ volts and $-17$ volts. The oscillator input terminal undergoes a corresponding change from $+11$ to $+0.9$ volts, with a corresponding change of oscillator output frequency from 27 kc.p.s. to 1.3 kc.p.s.

The oscillator output signal is impressed through conductor 27′ on the base 28 of transistor 29, which is at this time fully conducting. The amplified signal is thus impressed on the metering capacitors 41 and 43 in parallel. A current is produced through diodes 46 and 47 which is proportional to this frequency. This current is drawn through resistor 48.

The metering action by which a current is produced which is proportional to input frequency is fully described in U.S. Patent No. 2,584,866.

Briefly explained, when a square wave signal is applied to the capacitors 41 and 43, during the positive half cycle current passes from the capacitors through the diode 47 to ground, and during the negative half cycle current is drawn through diode 46 to the capacitors. These currents are large enough so that the potential drop through resistor 48 depresses the potential of junction 54 to about $-\frac{1}{2}$ volt. It cannot go lower because the diode 63 becomes conductive and limits it. This is represented in FIGURE 2 at 74.

Figure 2:
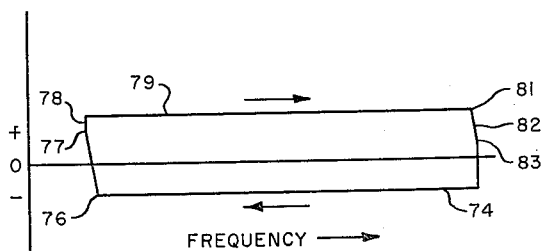
FIGURE 2 is a graph depicting the operation of the invention.

As the frequency drops, the current drawn through diode 46 drops proportionately, until at the point 76, FIGURE 2, the potential begins to be more positive than $-\frac{1}{2}$ volt, the diode 63 begins to become nonconductive, and the graph of FIGURE 2 rises steeply.

At some point, at approximately $+1$ volt of the base 56, the transistor 57 begins to conduct, in turn causing transistor 67 to begin to conduct, drawing some current through the relay coil 39. At some higher current corresponding to about $+1.2$ volts at the base 56, the relay current becomes high enough to operate the relay. This occurs at the point 77, FIGURE 2.

When the relay 39 operates, it opens the contacts 38/42, reducing the capacitance to about $\frac{1}{20}$ of its former value and therefore, in accordance with the frequency metering relation $-i=KCf$, the current $i$ is greatly reduced. This allows the potential at junction 54 to rise, making the transistors 57 and 66 fully conductive. Their conduction, together with the current through diode 46, limits the positive potential at the base 56 to not much more than 1.2 volts above ground. This upward potential jump is indicated by the vertical line at 78 in FIGURE 2.

When relay 39 operates contact arm 72, the shunt is removed from the integrator 16 and the relatively large negative potential of $-25$ volts is applied to its input. This causes the integrator output to rise rapidly from $-17$ to $+10$ volts, causing the oscillator output signal frequency to fly back rapidly from 1.3 kc.p.s. toward 27 kc.p.s. This is indicated in FIGURE 2 by the horizontal line 79 at the limit of slightly over $+1.2$ volts at which the junction 54 is limited.

The current through resistor 48 rises during this increase of frequency, until at point 81 the potential drop causes the potential at 54 to drop below $+1.2$ volts, as shown by the steeply dropping line 82. At point 83 the relay drops out and the potential falls abruptly. The time of this flyback action is 5.7 seconds. The entire cycle is the repeated, and continues until a signal is acquired. This operates relay 23 and stops the search action.

It is to be noted that upon the start of flyback, along line 79, the relay holding current is greatly augmented, and upon the starting of sweeping, along line 74, the relay 39 current is made to drop abruptly from its drop-out value to zero. Thus the relay is positively locked in or locked out.

What is claimed is:

1. A sweep and flyback circuit for use with a resonant frequency tracker containing an oscillator the frequency of which is controlled by the potential output of an integrator including a feedback capacitor comprising, frequency meter means of generating an output signal the amplitude of which is proportioned to the frequency of a signal impressed on its input, a control circuit impressing the output of said oscillator on the input of said frequency meter means, a relay, means of operating said relay to a first state of operation when the output amplitude of said frequency meter means attains a first selected value and for producing a second state of relay operation when said output amplitude falls below said selected value, means actuated by said relay in its second state of operation for applying a selected fixed potential to the input of said integrator of such a value as to cause the output potential thereof to rise abruptly, and means actuated by said relay in its first state of operation for applying a resistive shunt across the feedback capacitor of said integrator causing said capacitor to discharge and the output potential of said integrator to decrease over a selected time interval.

2. A sweep and flyback circuit in accordance with claim 1 including means operated by frequency tracker output signals exceeding a predetermined signal-to-noise ratio for disabling said frequency meter means and for preventing the application of said resistive shunt across said integrator feedback capacitor.

3. A sweep and flyback circuit in accordance with claim 1 including means actuated by frequency tracker input signals exceeding a predetermined signal level for reducing the resistive value of the shunt across said integrator feedback capacitor for decreasing the capacitor discharge time interval.

4. A sweep and flyback circuit connected to a resonant frequency tracker containing an oscillator the frequency of which is controlled by the potential output of an integrator the input and output of which are connected by a feedback capacitor comprising, a frequency meter converting an input signal frequency into a proportional potential amplitude, including a pair of diodes connected in series with each other, a resistor connected between one of said diodes and a potential source, an output circuit connected to the junction of said resistor and said one diode, and capacitative means connected in series between the input of said frequency meter and the common junction of said diodes, a control circuit interconnecting the output of said oscillator to the input of said frequency meter, a relay, means operating said relay to a first state of operation when the potential output of said frequency meter attains a first selected value and producing a second state of operation when said potential output falls below said selected value, means actuated by said relay in its second state of operation for applying a selected fixed potential to the input of said integrator of such a value as to cause the output thereof to rise abruptly, and means actuated by said relay in its first state of operation for applying a resistive shunt across the integrator feedback capacitor causing said capacitor to discharge and the output potential of said integrator to decrease over a selected time interval.

5. A sweep and flyback circuit in accordance with claim 4 including means actuated by said relay in its second state of operation for reducing the value of the capacitative means of said frequency meter to a fraction of its value as compared to that attained thereby when said relay is in its first state of operation.

6. A sweep and flyback circuit in accordance with claim 5 including means operated by frequency tracker output signals exceeding a predetermined signal-to-noise ratio for preventing signal transfer from the output of said oscillator through said control circuit and for preventing the application of said resistive shunt across said integrator feedback capacitor.

7. A sweep and flyback circuit in accordance with claim 6 including means actuated by frequency tracker input signals exceeding a predetermined signal level for reducing the resistive value of said resistive shunt for reducing the time interval of discharge of said integrator feedback capacitor.

No references cited.